(12) United States Patent
Rossum et al.

(10) Patent No.: US 7,248,934 B1
(45) Date of Patent: Jul. 24, 2007

(54) METHOD OF TRANSMITTING A ONE-DIMENSIONAL SIGNAL USING A TWO-DIMENSIONAL ANALOG MEDIUM

(75) Inventors: David Rossum, Monterey, CA (US);
Mark Dolson, Ben Lomond, CA (US);
Jean LaRoche, Santa Cruz, CA (US);
Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 478 days.

(21) Appl. No.: 09/703,510

(22) Filed: Oct. 31, 2000

(51) Int. Cl.
*G06F 17/00* (2006.01)
*G03B 17/24* (2006.01)
*G03B 27/32* (2006.01)

(52) U.S. Cl. .......................... 700/94; 396/312; 355/31
(58) Field of Classification Search ................ 396/312, 396/310, 14; 235/494, 460; 369/14; 355/31; 700/94; 348/231.4
See application file for complete search history.

(56) References Cited

U.S. PATENT DOCUMENTS

| | | |
|---|---|---|
| 3,439,598 A | 4/1969 | Weitzner |
| 4,983,996 A | 1/1991 | Kinoshita |
| 5,276,472 A | 1/1994 | Bell et al. |
| 5,313,235 A | 5/1994 | Inoue et al. |
| 5,313,564 A | 5/1994 | Kafri |
| 5,363,157 A | 11/1994 | Cocca |
| 5,369,261 A | 11/1994 | Shamir |
| 5,389,989 A | 2/1995 | Hawkins et al. |
| 5,521,663 A | 5/1996 | Norris |
| 5,801,848 A | 9/1998 | Kafri |
| 5,867,593 A | 2/1999 | Fukuda et al. |
| 5,896,403 A | 4/1999 | Nagasaki et al. |
| 5,897,669 A * | 4/1999 | Matsui .................. 235/462.07 |
| 5,996,893 A | 12/1999 | Soscia |
| 5,999,899 A * | 12/1999 | Robinson .................... 704/222 |
| RE36,589 E * | 2/2000 | Akamine et al. |
| 6,044,348 A | 3/2000 | Imade et al. |
| 6,163,656 A * | 12/2000 | Yoshioka .................... 396/429 |

(Continued)

FOREIGN PATENT DOCUMENTS

JP          2003348327          12/2003

(Continued)

OTHER PUBLICATIONS

"Terminal Equipment and Protocols for Telematic Services: Information Technology—Digital Compression and Coding of Continuous-Tone Still Images—Requirements and Guidelines", International Telecommunication Union Recommendation T.81,(1993), 186 pages.

(Continued)

*Primary Examiner*—Xu Mei
(74) *Attorney, Agent, or Firm*—Schwegman, Lundberg, Woessner & Kluth, P.A.

(57) ABSTRACT

A method and apparatus for printing a one-dimensional, continuous signal, such as a sound wave, as a printed pattern and for recovering the sound wave from the printed pattern. The method decomposes the one dimensional signal two-dimensional function that is continuous in both dimensions. The two-dimensional function can be printed as a pattern on to a paper substrate using a standard printer. The audio signal is recovered by scanning the pattern and processing the scanned values.

20 Claims, 3 Drawing Sheets

U.S. PATENT DOCUMENTS

| | | | |
|---|---|---|---|
| 6,229,964 | B1 | 5/2001 | Bell |
| 6,247,649 | B1* | 6/2001 | Nada ................... 235/462.45 |
| 6,322,181 | B1* | 11/2001 | Silverbrook .................. 347/2 |
| 6,388,681 | B1* | 5/2002 | Nozaki ....................... 345/764 |
| 6,460,155 | B1* | 10/2002 | Nagasaki et al. ........... 714/752 |
| 6,466,262 | B1 | 10/2002 | Miyatake et al. |
| 6,618,511 | B1 | 9/2003 | Mancuso et al. |
| 2001/0052542 | A1 | 12/2001 | Matsueda et al. |
| 2005/0185069 | A1 | 8/2005 | Sim et al. |
| 2005/0212930 | A1 | 9/2005 | Sim et al. |

FOREIGN PATENT DOCUMENTS

| | | |
|---|---|---|
| JP | 2004153737 | 5/2004 |
| JP | 2004163485 | 6/2004 |
| JP | 2004173172 | 6/2004 |
| WO | WO-99/55037 | 10/1999 |

OTHER PUBLICATIONS

Chae, J. J., et al., "A Technique for Image Data Hiding and Reconstruction without Host Image", *Proceedings of the SPIE, 3657*, San Jose, CA,(Jan. 1999), 386-396.

Chen, Brian, et al., "Quantization Index Modulation: A Class of Provably Good Methods for Digital Watermarking and Information Embedding", *IEEE Transactions on Information Theory*, 47(4), (May 2001), 1423-1443.

Cho, Youngkwan, et al., "Multiring Fiducial Systems for Scalable Fiducial-Tracking Augmented Reality", *Presence*, 10(6), (Dec. 6, 2001), 599-612.

Conway, J. J., et al., "Fast quantizing and decoding and algorithms for lattice quantizers and codes", *IEEE Transactions in Information Theory*, (28)2, (March 1982), 227-232.

Gortler, Steven J., et al., "The Lumigraph", *International Conference on Computer Graphics and Interactive Techniques, Proceedings of the 23rd annual conference on Computer graphics and interactive techniques*, (1996), 43-54.

Jacobsen, N., et al., "Image Adaptive High Volume Data Hiding Based on Scalar Quantization", *IEEE MILCOM 2002. Proceedings , vol.: 1*, (Oct, 7-10, 2002), 411-415.

Mukherjee, D., et al., "A source and channel-coding framework for vector-based data hiding in video", *IEEE Trans. on Circuits and Systems for Video Technology*, 10(4), (Jun. 2000), 630-645.

Solanki, K., et al., "High-volume data hiding in images: Introducing perceptual criteria into quantization based embedding", *Proceedings of ICASSP*, (May 2002), 1-4.

Wolfgang, Raymond B., et al., "Perceptual Watermarks for Digital Images and Video", *Proceedings of the IEEE*, 87(7), (Jul. 1999), 1108-1126.

Griffin, Daniel W., et al., "Signal Estimation from Modified Short-Time Fourier Transform", *IEEE Transactions on Acoustics, Speech, and Signal Processing*, vol. ASSP-32 No. 2, (Apr. 1984), 236-243.

Princen, John P., et al., "Analysis/Synthesis Filter Bank Design Based on Time Domain Aliasing Cancellation", *IEEE Transactions on Acoustics, Speech, and Signal Processing*, vol. ASSP-34 No. 5, (Oct. 1986), 1153-1161.

Rubin, Philip, et al., "The Pattern Playback", http://www.haskins. yale.edu/haskins/MISC/PP/pp.html, One page each on: The Pattern Playback, Pattern Playback: Background, Pattern Playback Diagram, Pattern Playback Sentences, Playback Sentence: "These days . . . " (5 pages),(Nov. 10, 2003).

Vail, Mark, Keyboard Reports: MetaSynth Bundle. http://www. keyboardonline.com/demos/metasynthbundle/index.shtml [retrieved on Oct. 27, 2000] Retrieved from the Internet.

\* cited by examiner

METHOD OF TRANSMITTING A ONE-DIMENSIONAL SIGNAL USING A TWO-DIMENSIONAL ANALOG MEDIUM

BACKGROUND OF THE INVENTION

The present invention is related to the field of audio signal processing and more specifically to techniques for transmitting and recovering one-dimensional signals.

The association of audio with graphic images creates a rich multi-media experience. Typically multi-media creation or playback requires a computer and other sophisticated and expensive electronic equipment. The audio portion is either a digital file which is stored on a CD or disk or an analog signal encoded on magnetic tape.

Often, however, graphic images are printed and saved on paper which is then stored in files or albums. There is no currently existing technique for easily associating audio with these printed graphic images.

Various techniques for transferring information characterizing an audio signal to paper have been developed. All of these techniques have been intended for examination and analysis of the audio waveform or spectrum, rather than for reproduction of the sound. For example, spectrographs for displaying time domain information as frequency domain information on an analog medium are well known. Originally implemented as analog devices, spectographs were utilized to record spectograms on special paper using a spinning drum. These devices were disadvantageous for a number of reasons, including poor resolution and the requirement for a special paper type. While digital spectographs have been implemented, the images or spectrograms produced by digital spectographs are such that the original information is unrecoverable from the spectograms.

Other devices such as a "Pattern Playback" convert spectrographic pictures (voice prints) into sound signals. The pictures can be synthetic patterns that are painted by hand, or photographic copies of actual spectrograms. The Pattern Playback use a tone wheel for providing the first 50 harmonics of a fundamental frequency of 120 Hz, therefore providing a frequency range of 0 Hz to 6 KHz. Disadvantageously, the device speaks only in a monotone due to the fixed fundamental frequency. Additional information regarding pattern playback is obtainable at the following URL: http://www.haskins.yale.edu/MISC/PP/pp.html.

Further yet, other devices have been described that take an image as an input (for example, formant or sinusoidal trajectories) and generate a signal as an output. However, no practical technique is described for converting audio into an image.

Another prior art encoding technique is helical scanning, used for example in VCRs. In this case, the 1D signal is represented in the 2D medium as a series of strips, each representing a window of time. For example, consider the case where the 1D signal is an audio waveform and that the windows are printed vertically on the page with adjacent windows proceeding horizontally. To reconstruct the 1D signal, one simply reads a vertical strip, and at its end, moves to the next horizontal strip. Note that while the 2D signal is vertically continuous, it is not horizontally continuous. Moving horizontally one will encounter discrete, unrelated values as each strip number is traversed. Accordingly, there must be a provision to register with the new strip in order to obtain accurate results.

There is also a prior art "digital" technique which encodes signals onto an image. But this technique is designed purely for digital signals, and includes substantial error correction and detection to ensure the absence of noise in the transmitted signal. It also uses discontinuous imaging—the image is made up of individual dots, each of which conveys discrete information. Additional information on this technique is available at the following URL: http://www.intacta.com. Such a discrete system requires accurate registration because the system must be able to determine whether the area being scanned represents one of two binary values. If the scanner views the edge of a dot the information is meaningless because it is not possible to determine which of the binary values is encoded.

Accordingly, there does not currently exist a practical and efficient technique for transmitting audio/voice signals on paper or other media having graphic content so that the audio/voice can be associated with graphic content.

SUMMARY OF THE INVENTION

According to one aspect of the present invention, an audio signal can be transmitted by a paper or other continuous analog medium using low-cost computer equipment available to consumers. A pattern that has an attribute which is continuous in two-dimensions, derived from an audio signal, is printed on the paper. This pattern is then scanned to obtain an array of values which are processed to recover that audio signal. The pattern can be printed along with graphics to easily associate audio/voice with the graphic content.

According to another aspect of the invention, a two-dimensionally continuous function is printed as a pattern onto a paper substrate. A single value of the function is printed as one or a plurality of dots having the same intensity, where the intensity or darkness indicates the value of the function. This function is a decomposition of a one-dimensional analog audio signal.

According to another aspect of the invention, the printed pattern is scanned to obtain an array of values of a two-dimensional function indicating the intensity of the image at various coordinates of the pattern. The values of the array are utilized to determine the values of the continuous two-dimensional function. These values are then processed to reconstruct the one-dimensional analog audio signal.

According to another aspect of the invention, the analog audio signal is sampled to form a digital sound file. The two-dimensional function is an overlapped short-term Fast Fourier Transform (FFT) of this digital file, having the dimensions of time and frequency. The FFT is adequately represented by printed values of the function that continuously vary in both dimensions.

According to another aspect of the invention, the array is processed to determine the values for a set of FFT bins and an inverse-FFT is used to recover the audio signal. The values of the FFT bins are obtained by sampling the continuous function.

According to another aspect of the invention, only the magnitude of the Fourier Transform is printed as intensity value. A phase-unrolling technique is utilized to re-synthesize the phase when recovering the audio signal.

According to another aspect of the invention, a hand-held scanner is used to obtain the array of values. The scanner is swept along the printed pattern to obtain the array values and a built-in microcontroller recovers the audio signal which is amplified by a battery-powered speaker to generate the recovered sound.

According to another aspect of the invention, a photographic image and sound pattern are printed on a paper substrate to form a "talking" photograph. A sound recorded contemporaneously with the taking of the photograph is transmitted to the printed sound pattern. Alternatively, the sound record can be recorded subsequent to the pictured event to provide audio annotation.

Because the sound-decomposing function has continuity in two dimensions there is no need to keep track of the pixel boundaries in either dimension. This allows much higher information density, assuming some amount of noise is acceptable. Having an amount of acceptable noise is related to the constraint that the input signal be continuous. A discontinuous "digital" input signal, such as a computer program, cannot tolerate any noise and thus must be encoded with intersymbol spaces to allow registration of the scanning mechanism.

Other features and advantages of the invention will be apparent in view of the following detailed description and appended drawings.

DETAILED DESCRIPTION OF THE PREFERRED EMBODIMENTS

Overview

Figure 1:
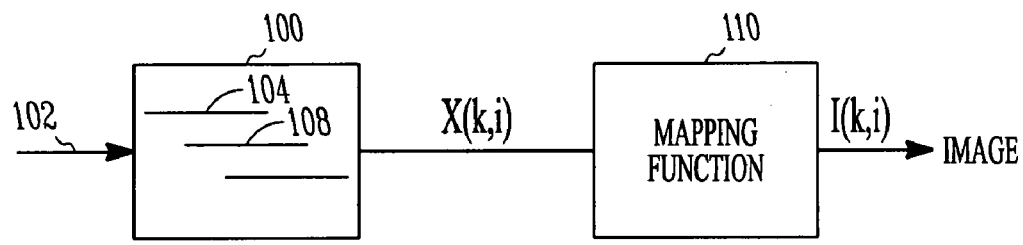
FIG. 1 is a block diagram of a system for performing magnitude-only spectral decomposition of an audio signal.

The present invention describes techniques for transmitting a one-dimensional signal using an analog two-dimensional medium, and recovering the one-dimensional signal from the analog two-dimensional medium. An example of a one-dimensional signal is an audio signal which represents the single dimension of a real-valued pressure wave as a function of time, while the term "analog" may specify, for example, the darkness of ink on paper. Also, the term two-dimensional may refer to the horizontal and vertical dimensions of a picture on a paper medium. As used herein, a "one-dimensional signal" is one that represents a single dependent variable as a function of an independent variable. For example, the dependent variable for an audio signal is instantaneous pressure and the independent variable is time.

It should be noted that while, in the case of an audio signal, the dependent variable is a real value, the techniques of the present invention are applicable to a complex value as long as the value remains continuous. In addition, as used herein, a "two-dimensional medium" is one that produces an amplitude (gray scale or color, which can thus be real or complex) for two independent variable dimensions (such as horizontally and vertically across a page).

Techniques

The present invention utilizes a number of techniques for transmitting a one-dimensional signal using an analog two-dimensional medium, and recovering the one-dimensional signal from the analog two-dimensional medium, for example, magnitude only spectral encoding, CELP (code excited linear prediction) type encoding and MDCT (modified discrete cosine transform) encoding. These techniques will further be understood by reference to the diagrams and descriptions which follow.

A preferred embodiment of the invention is a method of "transmitting" a 1D signal using an analog 2D medium. A continuous one-dimensional signal (of which an audio signal which represents the single dimension of a real valued pressure wave as a function of time is an example) to an analog (for example, the darkness of ink on paper) two dimensional (as in the horizontal and vertical dimensions of a picture on paper) medium. The input signal is constrained to be continuous. The 1D input signal can be analog or digital, but, if it is digital, it must be either representative (as by sampling at an adequately high rate) of a continuous analog signal, or adequately represented by converting back from digital values into the analog domain. In particular, a digital signal that represents purely an array of unrelated (therefore discontinuous) numbers, such as a machine code representation of a software program, is not applicable.

The transmitting medium is analog in nature. Typically, the medium is noisy in both amplitude (such as the variations of intensity of a printed image caused by the fibrous nature of the paper and the random variations of the printing process) and location (such as the bleeding of ink on paper, and the random misalignment inherent in any printing or scanning process). The medium should also be capable of representing an essentially continuous signal in both amplitude (the scale of gray or color printed at a particular location, either by half-tone or by variable ink density) and position (by the natural blending of adjacent pixels due to ink flow).

The input signal is one dimensional in the sense that it represents a single dependent variable as a function of an independent variable. For audio, the dependent variable is instantaneous pressure and the independent variable is time. It should be noted that while, in the case of audio, the dependent variable is a real value, the technique can also work for a complex value as long as the value remains continuous. The transmitting medium is two-dimensional in the sense that it can produce an amplitude (gray scale or color, which can thus be real or complex) for two independent variable dimensions (such as horizontally and vertically across a page). Another transmitting media having such properties is a 2D section of magnetic recording tape.

The basic method of this embodiment is to mathematically decompose the continuous 1D using a technique into a two dimensional function which remains continuous in both dimensions. The short term Fourier transform is an example of one such mathematical decomposition which meets the constraints. The complex valued continuous Short Term Fourier Transform $F(f,t)$ varies slowly and continuously both in the frequency (f) and time (t) dimensions. The discrete Short Term Fourier Transform $X(k,i)$ adequately represents $F(f,t)$ when there is sufficient overlap between adjacent frames and a sufficient number of frequency bins. In this case, the complex value of $X(k,i)$ varies slowly and continuously with both the bin number k and the frame number i. Thus the discrete Fast Fourier Transform represents a sampled version of the continuous Short Term Continuous Fourier Transform, and it is the existence of this continuous transform which is useful in the preferred embodiment.

Magnitude Only Spectral Encoding

FIG. 1 is a block diagram of the magnitude-only spectral encoding algorithm. As implied by its name, magnitude-only spectral encoding involves encoding only the magnitude of the spectral components of a continuous one-dimensional signal. Generally, this technique involves the steps of: (1) using a mathematical technique to decompose the signal into a two-dimensional function which is continuous in both directions, and (2) encoding the magnitude (but not the phase) of the frequency bins into an image. A further step of recovering the original signal is implemented. To recover the original image, the image is scanned, using, for example, a standard image scanner, and analyzed to estimate the magnitude of the spectral components. The signal is then reconstructed by use of any magnitude-only reconstruction technique (one of which is described later).

Using a Mathematical Technique to Decompose the Signal

As shown in FIG. 1, in one embodiment a mathematical technique involving short-term Fourier transforms such as FFTs (Fast Fourier Transforms) is used to decompose the signal into a two-dimensional function which is continuous in both directions. An FFT module 100 functions to implement the technique. FFT module 100 is preferably a specialized processor such a high bandwidth digital signal processor which is adapted to perform FFT processing.

As shown, FFT module 100 receives an input signal 200 for decomposition. Input signal 200 is constrained to be a digital representation of samples of a continuous time signal. Upon receiving this signal, FFT module 100 repeatedly performs FFTs upon time frames or "windows" 104, 108 which contain samples of the signal 102. In this case, each window is overlapped with the subsequent window by 50% or 75% until all samples are accounted for. In particular, window 104 overlaps with window 108, and window 108 overlaps with the following window (not shown), etc., until the end of the sequence. Each window has in common with the preceding window a number of samples which depend on the amount of overlap.

In a typical implementation, an N-point FFT is applied to the windows where "N" is the number of points for the FFT implementation. N is chosen to be large enough that the frequency representation is continuous. In practice, 256 points are sufficient for an 8 kHz audio sample rate. The result is a series of output frequency bins represented by complex numbers X(k, i) in the frequency domain. The complex numbers have real and imaginary parts, where |X(k,i)| denotes the magnitude of the FFT bin, k denotes the bin index (i.e., indicates the frequency) and is an integer between 0 and N/2−1, and i denotes the analysis frame index. The value of |X(k,i)| is typically calculated and expressed in dB. For example, if signal 102 were sampled at 8 kHz, one could use an FFT size of 256 points. Each 256-point FFT overlaps 50% or 75% (meaning, windows are located every 128 points or every 64 points) which would yield a succession of output frequency domain frames, each containing 128 real, positive numbers. The overlapping of the FFTs assures that the magnitudes of the bins vary continuously in time. It should be noted that an N-point FFT yields N/2 values for the frequencies between 0 and half the sampling rate.

Encoding the Magnitude of the Output Frequency Bins of the Signal into an Image

Figure 2:
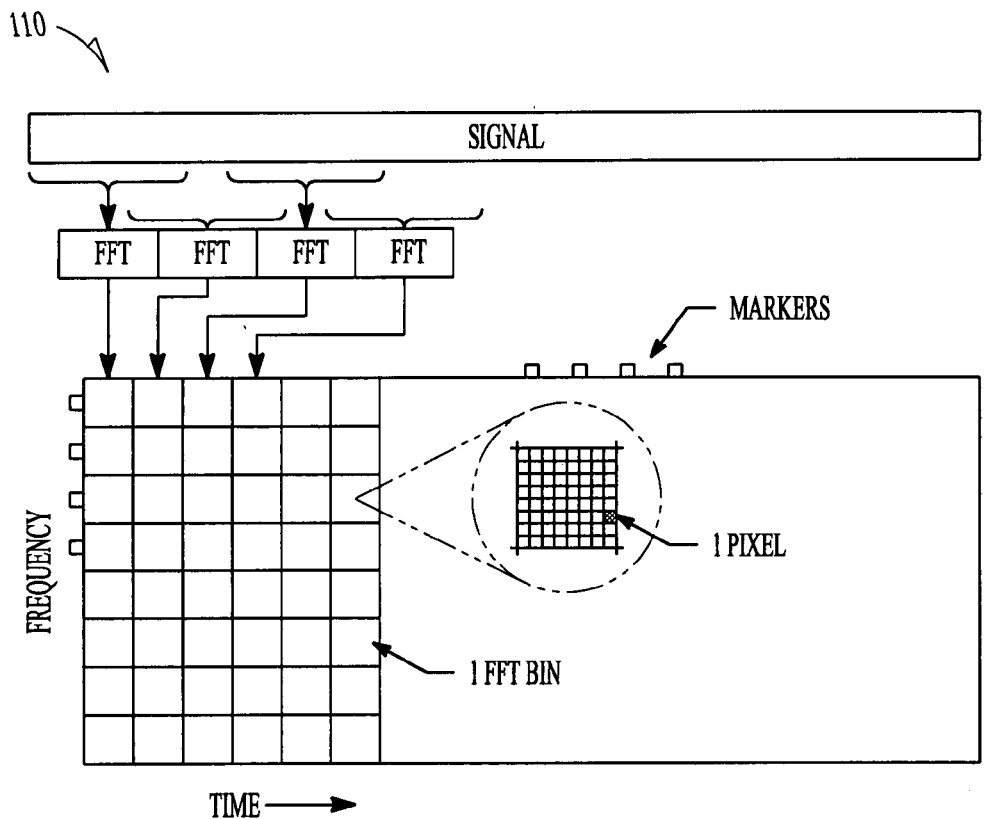
FIG. 2 is a schematic diagram of a preferred embodiment of the pattern generation system.

Thereafter, the output frequency bins versus time representation is transmitted as an image, as shown in FIG. 2. Each frequency bin is represented by a single pixel or a rectangular group of pixels whose intensity is a function of the bin's magnitude. Alternatively, the intensity of intermediate pixels between pixels representing frequency bins can be interpolated. For example, using a magnitude-to-pixel mapping function 110, each frequency bin magnitude k is encoded as a small group of pixels in the image. One such function calculates the magnitude in dB, and maps linearly a magnitude range [Min(dB) Max(dB)] into a pixel intensity range [PixMin PixMax] used to generate a black and white picture:

$$I(k, i) = Pix\text{Min} + (Pix\text{Max} - Pix\text{Min})\frac{20\log10(|X(k, i)| - MindB}{MaxdB - MindB}$$

where Pix is the pixel intensity. In FIG. 2, as shown, the pixels are laid out in a rectangular pattern.

Figure 3:
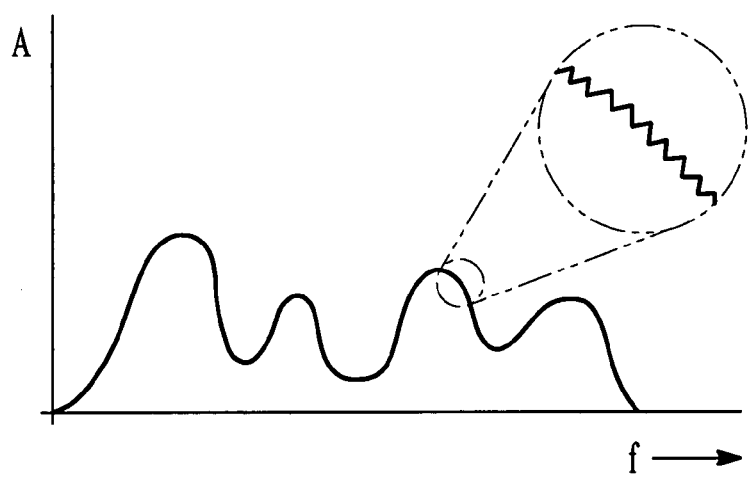
FIG. 3 is a graph depicting the frequency bins of an STFFT.

As depicted in FIG. 3, the FFT, although mathematically discrete, is adequately represented by a continuous curve. The insert depicts the actual discrete values of the FFT bins which are not reproducible by the printing process. Accordingly, due to the physical characteristics of paper and the printing process, the actual pattern printed on the paper is continuous. The paper and printing process function as a low-pass filter to smooth the theoretical sharp edges of the FFT. The resulting continuous curve can be re-sampled to determine the magnitude of the frequency bins that will be used for the inverse FFT which will synthesize the recovered signal. Note that because the continuous function has been resampled, the actual values presented to the inverse FFT will not be identical to those used by the printing process. The fact that the two-dimensional function is continuous in both dimensions guarantees that this difference will be inconsequential, and that the recovered signal will be substantially the same as the input signal.

This is similar to the well-known process of sampling a continuous analog audio signal to generate a digital sound file. The audio file is reproduced by low-pass filtering the discrete time values to regain the continuous analog signal. Thus, the magnitudes of the FFT bins is adequately represented by a continuous analog signal.

The inventors have discovered that utilizing a continuous signal greatly enhances the quality of sound that can be transmitted in a small area. Also, transmission of a continuous signal is easily accomplished utilizing standard, low-cost printers available to consumers.

Decoding to Recover the Original Signal

Figure 4:
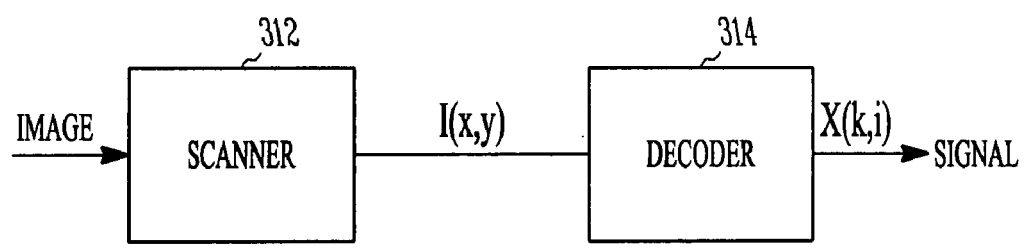
FIG. 4 is a block diagram of a preferred embodiment of a scanning system.

As shown in FIG. 4, a scanner 312 is utilized to scan the image created by the above procedure to yield a series of pixel values I(x,y). Thereafter a decoder 314 is employed to reconstruct |X(k,i)| from the pixel values, and synthesize the original signal from |X(k,i)|.

In one embodiment, in order to recover |X(k,i)| from I(x,y), decoder 314 averages the values of the pixels in the rectangular pattern corresponding to |X(k,i)| (assuming the location of the rectangular pattern is known), and applies the inverse function of the mapping used to encode the image to obtain |X(k,i)|. Averaging the pixel values reduces the amount of noise inevitably introduced by the printing process and makes the estimate of |X(k,i)|more accurate. To help locate the area in the image that corresponds to |X(k,i)|, in a preferred embodiment a series of markers (for example, small dots at the edges of the image) that indicate where the centers of each frame and each FFT bin are located, can be added to the image.

Since, as described above, the magnitudes of the FFT bins are printed as a continuous signal, there is no need to precisely register the scanner to areas of the grid. Unlike a discrete signal, all areas of the continuous signal contain information that can be used to recover the audio signal.

Once |X(k,i)| is known for all frames k and all bins i, reconstructing the original signal requires resynthesizing the missing phases. Several well-known techniques exist to do so (Griffin, D. W. et al., *IEEE Trans. Acoust., Speech, Signal Processing*, ASSP-32(2):236-243, 1984). A simple technique consists of identifying peaks in each FFT frame (for example, by looking at FFT bins which are larger than their two neighbors on each side) and letting the phase of these peak bins unwrap based on the peak frequency. Denoting $k_0$ the index of a given peak at frame i, and $\Phi(k, i-1)$ the calculated phases at frame i-1, one can set $$\Phi(k_0, i) = \Phi(k_0, i-1) + 2\pi \frac{k_0 R}{N}$$

where N is the length of the FFT, and R is the number of samples between frame i and frame i+1. The phases of the bins around the peak can be set to be equal to the phase of the peak $i_0$. Once the phases $\Phi(k,i-1)$ have been reconstructed, the signal can be re-synthesized by a standard inverse short-term Fourier transform (Kahrs, M. et al., *Applications of Digital Signal Processing to Audio and Acoustics*, Kluwer, Norwell, Mass. 1998).

Figure 5:
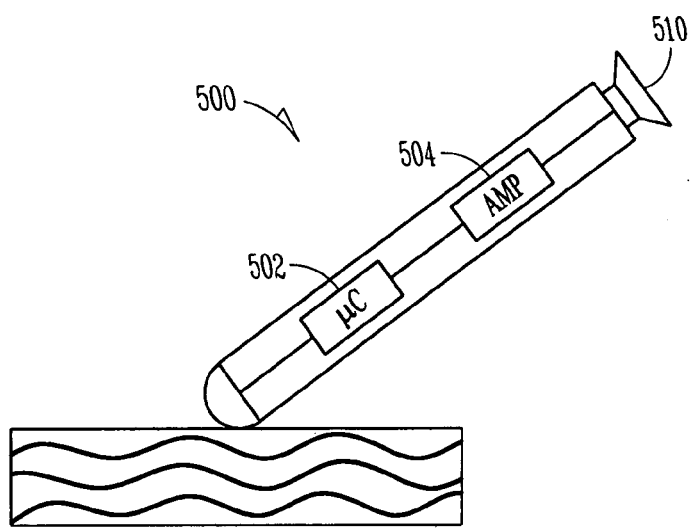
FIG. 5 is a diagram of a hand-held pen-like scanner for processing a printed pattern to generate sound.

A preferred embodiment of the scanner is a hand-held scanner 500 as depicted in FIG. 5. The scanner is similar to an optical character reader (OCR) and generates an array of pixel values when scanned over a sound pattern. This array is then processed by a digital processor 502, as described above, to recover the audio signal. The audio signal is supplied to a battery-powered amplifier 504 and the output of the amplifier drives a loudspeaker 510. Thus, a voice represented by the sound pattern can be heard by scanning the pattern with the hand-held scanner.

Figure 6:
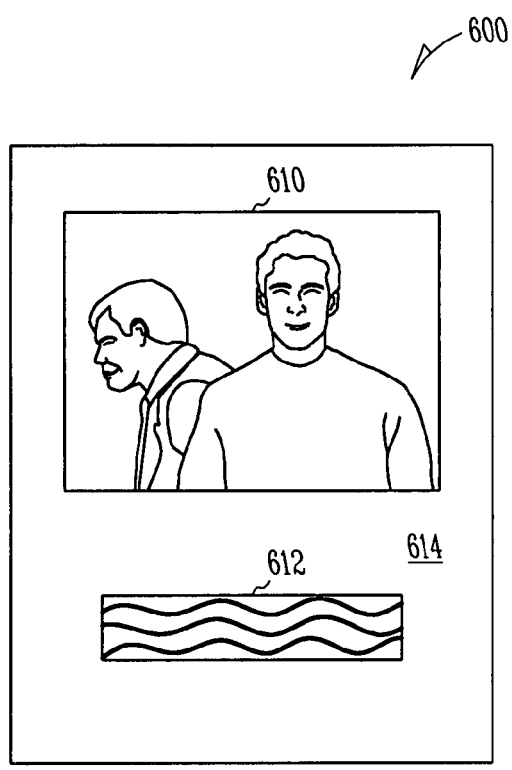
FIG. 6 is diagram depicting a "talking" photograph.

The sound transmitting technology described herein can be utilized to create a "talking" photograph 600. As depicted in FIG. 6, a photograph 610 and sound pattern 612 are printed on a paper substrate 614 utilizing commercially available printing technology. The sound pattern can represent a voice recorded contemporaneously with the photograph. These talking photographs can be stored in an album having a hand-held scanner attached so that the voice associated with the photograph can be heard each time the photograph is viewed. Alternatively, the sound pattern can represent a comment or description added at a subsequent time, for example a description of the people and location of the picture added when the photograph was printed for storage in the album.

Alternative Encoding Schemes

If color encoding is available, it is possible to use various colors to encode a given frame. For example, the FFT frame can be split into three parts, each being coded as a different color (typically, red, green and blue). Also, it is possible to encode the magnitude as the pixel intensity and the phase as the pixel hue (color), in which case there is no need to re-synthesize the phases as described above. The resynthesized signal is potentially closer to the original signal (providing encoding/decoding errors are limited).

In order to limit the number of pixels required in the image, it is possible to group FFT bins together and encode them as one would a single bin, for upper frequencies. This is because the resolution of human audition in upper frequencies is not as good as it is in lower frequencies, and larger errors in high frequencies can be tolerated in the encoding/decoding scheme.

Pitch/Envelope Encoding

An alternative way to encode/decode the signal consists of performing a pitch analysis of the signal, and estimating its spectral envelope. Every N samples (for example, every 10 ms), the pitch (fundamental frequency) is estimated by use of any of the well-known techniques for pitch estimation (Hess, W. J., *Algorithms and Devices for Pitch Determination of Speech-Signals*, Springer-Verlag, Berlin 1983). For example, the local auto-correlation of the signal C(k,n)

$$C(k, i) = \sum_{n=0}^{N} x(iR + n) x(iR + n + k)$$

can be calculated for values of k between 0 and $k_m ax$ and searched for a maximum which indicates the local period $P_i$ and therefore the pitch for fundamental frequency $1/P_i$. In the equation above, i denotes the frame and R is the hop size, the number of samples between two analyses. Alternately, a normalized cross-correlation can be used:

$$C_n(k, i) = \frac{C(k, i)}{\sqrt{\sum_{n=0}^{N} x(iR + n)^2 \sum_{n=0}^{N} x(iR + n + k)^2}}$$

Along with the pitch calculation a voiced/unvoiced decision can be made, which determines whether the signal is periodic or not. Many techniques exist for determining how periodic a signal is, one of which consists of comparing the maximum of the so-called normalized auto-correlation with the value for k=0.

$$p_i = \frac{C_n(k_0, i)}{C_n(0, i)}$$

This value is always smaller than 1, and the closer to 1 it is, the more periodic the signal is. The voiced/unvoiced decision can result simply from comparing $p_i$ to a given threshold (e.g., 0.7). The value of the pitch along with the voiced-unvoiced decision can be encoded at each frame, as a group of pixels, as described above for FFT bins.

The envelope can be estimated by an autoregressive (AR) model (Oppenheim, A. V. et al., *Discrete-Time Signal Processing*, Prentice Hall, Englewood Cliffs, N.J. 1989] and the so-called reflection coefficients or the Log-area ratios can be encoded as a group of pixels, as described above for FFT bins. Again, many techniques exist to calculate the AR envelope, and the reflection coefficients $k_i$ or the Log-area ratios.

Decoding involves extracting the pitch values from the image, along with the voice-unvoiced signal, and the reflection coefficients (or whatever was used to describe the spectral envelope), then filtering an "excitation signal" by a filter whose time-varying frequency response is equal to the envelope at each frame. The excitation signal is a mixture of white noise and periodic pulses at the fundamental frequency given by the pitch. These synthesis techniques are well-known in the speech coding community.

CELP Type Encoding

The standard CELP (Code Excited Linear Prediction) (Gersho, A. et al., *Advances in Speech Coding*, Kluwer, Boston Mass. 1991) encoding used in many speech codes can also be used to encode the signal into a two-dimensional image. In CELP, the pitch and the spectral envelope of the signal are estimated (typically by an AR model) and an excitation signal is obtained by inverse filtering the original signal by the AR filter representing the envelope. A codebook (a collection of typical excitation signals) is then searched for the best match with the excitation signal. The index of the best match is then transmitted to the decoder which has an identical copy of the codebook and therefore can recover the excitation from the index. The same principle can be used to encode the signal into an image. The pitch and the envelope are encoded as a continuous function as above, and the index in the codebook is also encoded as a group of pixels using discrete techniques. Decoding involves extracting the pitch, the envelope and the codebook index from the image at every frame, and filtering the corresponding excitation by a "pitch filter" (which restores the original pitch) and the envelope filter. An adaptive codebook scheme (Gersho, A. et al., *Advances in Speech Coding*, Kluwer, Boston 1991) can also be used.

MDCT Encoding

The Modified Discrete Cosine Transform (MDCT) (Princen, J. P. et al., *IEEE Trans. Acoust., Speech, Signal Processing*, 34(5):1153-1161, 1986) can also be used to describe the signal in a time-frequency framework. The advantage of the MDCT is that its output is real (whereas the output of the FFT is complex) and for a 50% overlap, in the absence of modification, the resynthesis yields a signal exactly equal to the original signal. In the technique described above, the output of the MDCT can be substituted for the magnitude of the FFT, the rest of the encoding remaining the same. The resynthesis stage no longer requires synthesizing phases, because the values of the MDCT are always real. The decoded signal is obtained by a standard inverse MDCT.

The invention has now been described with reference to the preferred embodiments. Alternatives and substitutions will now be apparent to persons of skill in the art. In particular, various printing and scanning technologies can be utilized in embodiments of the invention. Accordingly, it is not intended to limit the scope of the invention except as provided by the appended claims.

What is claimed is:

1. An audio/visual recording structure comprising:
   a paper substrate;
   a photographic image printed on said substrate; and
   a sound strip, printed on said substrate, comprising a pattern of printed dots arrayed in two dimensions, with intensity of the dots-representing the magnitude of a substantially continuous two dimensional mathematical function which is the decomposition of a one dimensional audio signal, with a pattern element printed at a coordinate pair representing specific values of the two dimensions, and with each pattern element including a plurality of printed dots having an intensity of one of a range of at least three intensities representing a value of the two-dimensional function at values of the coordinate pair.

2. A method for transmitting audio/voice utilizing a sound strip, the method comprising:
   receiving a one dimensional audio signal that is substantially continuous in time;
   mathematically decomposing, using a digital computer, the audio signal into a two-dimensional function of time and frequency having a substantially continuous value in both dimensions;
   printing the two-dimensional function as a pattern on a paper substrate, with a pattern element printed at a coordinate pair representing specific values of the two dimensions, and with each pattern element including a plurality of printed dots having an intensity of one of a range of at least three intensities representing a value of the two-dimensional function at values of the coordinate pair;
   scanning the pattern to obtain a scanned signal; and
   processing the scanned signal, using a digital computer, to recover the one dimensional audio signal.

3. The method of claim 2, where said audio signal is a sampled digital signal and mathematically decomposing comprises:
   performing a short-term, discrete fast Fourier transform (STFFT) on said audio signal, with each STFFT performed on a discrete window of said audio signal and where the windows overlap, where the magnitudes of the overlaps and frequency magnitudes between STFFT bins are selected so that the intensity of the two-dimensional printed pattern is a substantially continuous function in both dimensions.

4. The method of claim 2, wherein the range of at least three intensities comprises a substantially continuous range of intensities.

5. The method of claim 4, wherein the substantially continuous range of intensities is represented by a varying darkness of the dots.

6. A method for generating an audio signal, the method comprising:
   scanning a substantially continuous two-dimensional function printed as a pattern on a paper substrate, with each pattern element printed at a coordinate pair representing specific values of the two dimensions and each pattern element including a plurality of printed dots having an intensity of one of a range of at least three intensities representing a value of the two-dimensional function at values of the coordinate pair, to obtain an array of values indicating the magnitude of the intensity of the printed dots in said pattern;
   processing the array of values to obtain values of the two-dimensional function at said coordinate pairs;
   processing said values to determine the audio signal as a one-dimensional function of time; and
   converting the audio signal to sound to reproduce the audio signal transmitted as the two-dimensional pattern.

7. The method of claim 6, wherein the range of at least three intensities comprises a substantially continuous range of intensities.

8. The method of claim 7, wherein the substantially continuous range of intensities is represented by a varying darkness of the dots.

9. An apparatus for generating an audio signal, the apparatus comprising:
   a substantially elongated body having a proximate and distal end;
   a scanner, positioned at the proximate end of said housing, that generates an array of values indicating the intensity of a printed pattern of dots arrayed in two dimensions, with intensity of the dots representing the magnitude of a substantially continuous two-dimensional mathematical function which is the decomposition of a one-dimensional audio signal, with a pattern element printed at a coordinate pair representing specific values of the two dimensions, and with each pattern element including a plurality of printed dots having an intensity of one of a range of at least three intensities representing a value of the two-dimensional function at values of the coordinate pair;

a digital processor, supported by said body and coupled to said scanner to receive said array, programmed to process said array to recover and output the audio signal;

an amplifier, supported by said body and coupled to the digital processor to receive the audio signal, that amplifies the audio signal and outputs an amplified audio signal; and a loudspeaker, supported by said housing and coupled to receive said amplified audio signal, for converting the amplified audio signal to sound.

10. The apparatus of claim 9, wherein the range of at least three intensities comprises a substantially continuous range of intensities.

11. A method for transmitting audio/voice utilizing a sound strip, the method comprising:

receiving a one-dimensional audio signal that is substantially continuous in time;

mathematically decomposing, using a digital computer, the audio signal into a substantially continuous two-dimensional function of time and frequency having a substantially continuous magnitude in both dimensions;

printing the two-dimensional function as a pattern on a paper substrate, with a pattern element printed at a coordinate pair representing specific values of the two dimensions, and with each pattern element including at least one printed dot having an intensity of one of a range of at least three intensities representing a value of the two-dimensional function at values of the coordinate pair;

scanning the pattern to obtain a scanned signal; and processing the scanned signal, using a digital computer, to recover the one dimensional audio signal.

12. The method of claim 11, wherein the range of at least three intensities comprises a substantially continuous range of intensities.

13. The method of claim 12, wherein the substantially continuous range of intensities is represented by a varying darkness of the dots.

14. A method for generating an audio signal, the method comprising:

scanning a substantially continuous two-dimensional function printed as a pattern on a paper substrate, with each pattern element printed at a coordinate pair representing specific values of the two dimensions and each pattern element including at least one printed dot having an intensity of one of a range of at least three intensities representing a value of the two-dimensional function at values of the coordinate pair, to obtain an array of values indicating the magnitude of the intensity of the printed dots in said pattern;

processing the array of values to obtain values of the two-dimensional function at said coordinate pairs;

processing said values to determine the audio signal as a one-dimensional function of time; and converting the audio signal to sound to reproduce the audio signal transmitted as the two-dimensional pattern.

15. A method for transmitting a one dimensional audio signal that is substantially continuous in time, said method comprising:

mathematically decomposing, using a digital computer, the audio signal into a substantially continuous, two-dimensional function of time and frequency having a substantially continuous magnitude in both dimensions;

printing the two-dimensional function as a pattern on a paper substrate, with a pattern element printed at a coordinate pair representing specific values of the two dimensions, and with each pattern element including a plurality of printed dots having an intensity of one of a range of at least three intensities representing a value of the substantially continuous, two-dimensional function at values of the coordinate pair;

scanning the pattern on the paper to obtain an array of values indicating the magnitude of the intensity of the printed patterns;

processing the array of values to obtain recovered values of the substantially continuous, two-dimensional function at said coordinate pairs; and processing said recovered values to determine reconstructed values of a one dimensional function of time representing the audio signal.

16. The method of claim 15 comprising:

converting the reconstructed values to sound to reproduce the audio signal transmitted by the two-dimensional pattern.

17. The method of claim 15, wherein the range of at least three intensities comprises a substantially continuous range of intensities.

18. The method of claim 17, wherein the substantially continuous range of intensities is represented by a varying darkness of the dots.

19. A method for transmitting a one-dimensional audio signal that is substantially continuous in time, said method comprising:

mathematically decomposing, using a digital computer, the audio signal into a substantially continuous, two-dimensional function of time and frequency having a substantially continuous magnitude in both dimensions;

printing the two-dimensional function as a pattern on a paper substrate, with a pattern element printed at a coordinate pair representing specific values of the two dimensions and with each pattern element including at least one printed dot having an intensity of one of a range of at least three intensities representing a value of the substantially continuous, two-dimensional function at values of the coordinate pair;

scanning the pattern on the paper to obtain an array of values indicating the magnitude of the intensity of the printed patterns;

processing the array of values to obtain recovered values of the substantially continuous, two-dimensional function at said coordinate pairs; and processing said recovered values to determine reconstructed values of a one dimensional function of time representing the audio signal.

20. A method for transmitting audio/voice utilizing a sound strip, the method comprising:

receiving a one-dimensional audio signal that is substantially continuous in time;

mathematically decomposing, using a digital computer, the audio signal into a two-dimensional function of time and frequency having a substantially continuous value in both dimensions;

printing the two-dimensional function as a pattern on a paper substrate, with a pattern element printed at a coordinate pair representing specific values of the two dimensions and with each pattern element including a plurality of printed dots having an intensity interpolated between values at adjacent coordinate pairs and wherein the intensity is one of a range of at least three intensities;

scanning the pattern to obtain a scanned signal; and processing the scanned signal, using a digital computer, to recover the one-dimensional audio signal.

\* \* \* \* \*